Patented May 23, 1950

2,508,713

UNITED STATES PATENT OFFICE 2,508,713

TREATMENT OF KERATINOUS MATERIAL

Milton Harris, Bethesda, Md., and Alfred E. Brown, Washington, D. C., assignors to Harris Research Laboratories, Washington, D. C., a partnership No Drawing. Application October 7, 1946, Serial No. 701,622

5 Claims. (Cl. 8—127.6)

The present invention relates to the treatment of keratinous materials such as wool, hair, fur and the like to improve their chemical and physical properties, and to the resulting product.

Such materials are characterized by the presence therein of keratin, a fibrous protein containing amino acids including cystine. The amino acids are joined together by peptide linkages to form protein chains and the resulting chains are cross linked by the disulfide group (—S—S—) of cystine. This invention relates particularly to processes for treating keratinous materials, which processes involve modification of disulfide linkages therein.

It is an object of the invention to provide an improved process for treating keratinous materials to impart desirable properties thereto. A further object is to provide a modified keratinous material of enhanced resistance to the action of reducing, oxidizing and alkaline agents but retaining its physical properties substantially unimpaired.

By the invention we provide an effective, commercially practicable process for replacing relatively unstable disulfide bonds of keratinous materials with new chemical linkages which are resistant to the action of oxidizing, reducing and alkaline agents. It is well known that keratinous materials are subject to damage by such reagents. After treatment by our process, on the other hand, the keratinous materials not only have enhanced resistance to reaction with such agents, but at the same time retain subsvantially unimpaired the mechanical properties of the original material.

In accordance with the invention, the keratinous material is subjected to the action of a reducing agent for keratin in the presence of formaldehyde.

The action of reducing agents on keratinous material ordinarily results in rupture of disulfide linkages and damage to the fibre. In our process, however, the linkages ruptured by the reducing agent are immediately rebuilt with the formation of new stable linkages.

For purposes of illustration, the invention will be described with reference to its application to the treatment of wool textile fibres, in which connection the following examples may be given:

Example 1

8 parts of sodium sulfoxylate formaldehyde and 32 parts of commercial formalin are dissolved in 4800 parts of water and the pH adjusted to 7 with phosphates. Wool cloth, 160 parts by weight, is immersed in the solution and the mixture treated at the boil for one hour. The wool is then rinsed and dried. One-half the stated quantity of formaldehyde may be used with similar results.

Example 2

0.7 part by weight of concentrated ammonium hydroxide are added to 435 parts of water to which are added 0.7 part of sodium sulfoxylate formaldehyde and 2.9 parts of formalin. 14.5 parts of wool are immersed in this mixture which is then raised to the boil and kept there for 30 to 60 minutes. The wool is then removed, rinsed and dried.

Example 3

7.5 parts of sodium sulfoxylate formaldehyde and 2.9 parts of formalin are dissolved in 450 parts of water adjusted to pH 5.0 with acetate buffer. Wool cloth, 14.2 parts by weight, is immersed in this solution and the mixture is kept at 80° C. for 1 hour. The wool is then rinsed and dried.

Example 4

0.73 part of sodium hydrosulfite ($Na_2S_2O_4$) and 2.6 parts of formalin are dissolved in a solution of 0.5 molar borate buffer, pH 8.1. Wool, 14.6 parts by weight, is immersed in the solution and the mixture is treated at the boil for 30 minutes. The wool is then rinsed and dried.

Example 5

0.73 part of formamidinesulfinic acid and 2.9 parts of formalin are dissolved in a solution of 0.2 molar borate buffer, pH 8.2. Wool, 14.6 parts by weight, is immersed in the solution and the mixture is treated at the boil for 30 minutes. The wool is then rinsed and dried.

It has been found desirable to maintain the pH of the reaction at 3 or above, and preferably at pH 4–9.

Suitable reducing agents for use in our process are, for example, the various sulfoxylate formaldehyde compounds, the hydrosulfites and materials such as formamidinesulfinic acid. Other reducing agents may be used, but they should be of a type which does not react with the formaldehyde (as would thiol compounds such, for example, as thioglycolic acid and salts thereof, monothioethylene glycol, and other mercaptans), since otherwise the two components of the solution would be exhausted by reaction with each other and would not be available for reaction with the wool. The term "reducing agent" as used in the claims includes sulfoxylate formaldehyde compounds, hydrosulfites, formamidinesulfinic acid, and such other reducing agents for keratin as do not react with formaldehyde.

If hydrosulfite is the reducing agent employed, it will react with the formaldehyde present in the solution to form sulfoxylate. This should be taken into account in determining the amount of formaldehyde to be added to the reaction mixture.

The amount of reducing agent employed may be varied over wide limits, up to 100% or more on the weight of the wool, with no appreciable effect on the properties of the modified wool produced. This is due to the fact that as more disulfide linkages are ruptured, the scission products react with formaldehyde to form a new stable linkage.

Very little formaldehyde is required. As little as 0.00045 mol of formaldehyde per gram of wool gives good results. However, larger amounts may be used with no deleterious effects.

The liquor-wool ratio may be varied over a wide range with no significant differences in the properties of the wool derivative formed. We prefer to employ liquor-wool ratios between about 10 to 1 and 40 to 1.

The process is operative and effective within a wide range of temperatures. We prefer to carry out the treatment at temperatures between about 60° C. and 100° C. The duration of the treating time may be varied considerably; after the desired amount of modification has occurred, further treatment will not significantly change the properties of the modified keratin product. In general, treatment for about one-half hour to one hour at 80° C. or from about one-quarter to one hour at the boil gives good results.

With the proper amount of formaldehyde present, the number of stabilized links that can be formed in the fibre will depend on the concentration of reducing agent, the pH of the solution and the temperature and duration of the treatment.

The reaction of keratinous material with formaldehyde to form stable derivatives is known. This reaction, however, is generally similar to the "hardening" of proteins by formaldehyde. It is believed that it results in formation of additional cross linkages in the keratin molecule, but that the original disulfide linkages are not involved in the reaction and remain susceptible to attack by alkali, and oxidizing or reducing agents, etc.

It has also been proposed to treat keratin with a reducing agent and subsequently to treat the resulting product with formaldehyde. This treatment, however, also results in a product essentially different from and markedly inferior to that obtained by our invention. In the two-step process, deterioration of the fibre produced by the reducing agent persists in the final product to a substantial extent. The subsequent treatment with formaldehyde is not capable of restoring to the keratin its original properties.

While our invention is not limited to any theory of operation, it is suggested that the formaldehyde in the reducing solution, by forming stable linkages immediately upon rupture of the disulfide linkages, preserves the physical properties of the material. If, on the other hand, the reduced material is treated with formaldehyde in a separate step, the linkages formed by the formaldehyde are not in the proper position to restore the mechanical properties of the material.

When keratinous material is treated with reducing agent alone, under the conditions of our treatment, a substantial number of sulfhydryl groups are formed, as indicated by a strong nitroprusside reaction. The mechanical properties of wool so treated are markedly inferior to the untreated product—its tensile strength is greatly weakened and fabric becomes stiff and boardy. Keratinous material treated by our process, however, gives no nitroprusside reaction and the detrimental effects noted with reducing agent alone are negligible.

Our process is capable of easy control. It is relatively insensitive to small variations in conditions such as temperature, concentration of reagents, time of treatment, etc. No damage is caused either by high concentrations of reducing agent or unduly prolonged treatment.

We claim:

1. The process for chemically modifying keratinous material to impart thereto enhanced resistance to the action of reducing agents, oxidizing agents and alkalis while preserving substantially unimpaired the mechanical properties of the keratinous material, which consists essentially in immersing the keratinous material for from 15 to 60 minutes in a liquid bath at a pH between 3 and 9 and at a temperature in the range 60° C.–100° C., said bath containing a reducing agent for keratin which is inert to formaldehyde, to rupture disulfide linkages of the keratin, said bath also containing more than 0.00045 mol per gram of keratinous material of free formaldehyde, whereby new stable alkylene cross-linkages between the peptide chains of the keratin are formed immediately upon rupture of the disulfide linkages.

2. The process for chemically modifying wool to impart thereto enhanced resistance to the action of reducing agents, oxidizing agents and alkalis while preserving substantially unimpaired the mechanical properties of the wool which consists essentially in immersing the wool in a liquid bath at a pH between 3 and 9 and at a temperature in the range 60° C.–100° C., said bath containing a reducing agent for keratin selected from the class consisting of sulfoxylates, hydrosulfites and formamidine sulfinic acid, to rupture disulfide linkages of the wool, said bath also containing more than 0.00045 mol per gram of keratinous material of free formaldehyde, whereby new stable alkylene cross linkages between the peptide chains of the wool keratin are formed immediately upon rupture of the disulfide linkages.

3. The process for chemically modifying wool to impart thereto enhanced resistance to the action of reducing agents, oxidizing agents and alkalis while preserving substantially unimpaired the mechanical properties of the wool which consists essentially in immersing the wool in a liquid bath at a pH between 3 and 9 and at a temperature in the range 60° C.–100° C., said bath containing sodium hydrosulfite, to rupture disulfide linkages of the wool, said bath also containing more than 0.00045 mol per gram of keratinous material of free formaldehyde, whereby new stable alkylene cross linkages between the peptide chains of the wool keratin are formed immediately upon rupture of the disulfide linkages.

4. The process for chemically modifying wool to impart thereto enhanced resistance to the action of reducing agents, oxidizing agents and alkalis while preserving substantially unimpaired the mechanical properties of the wool which consists essentially in immersing the wool in a liquid bath at a pH between 3 and 9 and at a temperature in the range 60° C.-100° C., said bath containing sodium sulfoxylate formaldehyde, to rupture disulfide linkages of the wool, said bath also containing more than 0.00045 mol per gram of keratinous material of free formaldehyde, whereby new stable alkylene cross linkages between the peptide chains of the wool keratin are formed immediately upon rupture of the disulfide linkages.

5. The process for chemically modifying wool to impart thereto enhanced resistance to the action of reducing agents, oxidizing agents and alkalis while preserving substantially unimpaired the mechanical properties of the wool which consists essentially in immersing the wool in a liquid bath at a pH between 3 and 9 and at a temperature in the range 60° C.-100° C., said bath containing formamidine sulfinic acid, to rupture disulfide linkages of the wool, said bath also containing more than 0.00045 mol per gram of keratinous material of free formaldehyde, whereby new stable alkylene cross linkages between the peptide chains of the wool keratin are formed immediately upon rupture of the disulfide linkages.

MILTON HARRIS.
ALFRED E. BROWN.

REFERENCES CITED

The following references are of record in the file of this patent:

UNITED STATES PATENTS

| Number | Name | Date |
|---|---|---|
| 1,741,496 | Binns | Dec. 31, 1929 |
| 2,180,262 | Sturm | Nov. 14, 1939 |
| 2,222,526 | Block | Nov. 19, 1940 |
| 2,238,672 | Arthur | Apr. 15, 1941 |
| 2,261,094 | Speakman | Oct. 28, 1941 |
| 2,403,937 | Lubs | July 16, 1946 |
| 2,434,562 | Harris | Jan. 13, 1948 |

OTHER REFERENCES

Speakman, "Constitution, Properties and Uses of Wool," Textile Manufacturer, April 1940, page 160.

Hall, "Monthly Review," Textile Colorist, July 1944, pages 277-280.